US012777263B2

(12) United States Patent
Asakura et al.

(10) Patent No.: US 12,777,263 B2
(45) Date of Patent: Oct. 27, 2026

(54) DETECTING DEVICE

(71) Applicant: Magnolia White Corporation, Tokyo (JP)

(72) Inventors: Shinya Asakura, Tokyo (JP); Takanori Tsunashima, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 22 days.

(21) Appl. No.: 19/007,999

(22) Filed: Jan. 2, 2025

(65) Prior Publication Data

US 2025/0142224 A1 May 1, 2025

Related U.S. Application Data

(63) Continuation of application No. PCT/JP2023/023070, filed on Jun. 22, 2023.

(30) Foreign Application Priority Data

Jul. 5, 2022 (JP) ................................ 2022-108132

(51) Int. Cl.
*H04N 25/30* (2023.01)
*H04N 25/77* (2023.01)
*H04N 25/78* (2023.01)

(52) U.S. Cl.
CPC ............. *H04N 25/30* (2023.01); *H04N 25/77* (2023.01); *H04N 25/78* (2023.01)

(58) Field of Classification Search
CPC ........ H04N 25/30; H04N 25/76; H04N 25/77; H04N 25/78; H04N 5/32
See application file for complete search history.

(56) References Cited

U.S. PATENT DOCUMENTS

2020/0021759 A1* 1/2020 Tashiro ................ H04N 25/766
2021/0014432 A1* 1/2021 Kindt ...................... G01T 1/247
2021/0320143 A1* 10/2021 Smit ...................... H04N 25/30
2022/0191422 A1* 6/2022 Bohannon ............. H04N 25/77

FOREIGN PATENT DOCUMENTS

JP 2009-033316 A 2/2009
JP 2011-133441 A 7/2011
JP 2018-170543 A 11/2018

OTHER PUBLICATIONS

Search Report issued in related International Patent Application No. PCT/JP2023/023070, mailed on Sep. 5, 2023 and English translation of same. 5 pages.

* cited by examiner

*Primary Examiner* — Amy R Hsu
(74) *Attorney, Agent, or Firm* — K&L Gates LLP

(57) ABSTRACT

A detecting device including: a plurality of optical sensors; and a signal readout line, each of the plurality of optical sensors including a photodiode and an amplifier circuit, a plurality of the amplifier circuits provided in the plurality of optical sensors being connected in series with each other, outputs of a plurality of the photodiodes being connected to inputs of the plurality of amplifier circuits, respectively, via respective selecting switch circuits, and outputs of the plurality of amplifier circuits being connected to the signal readout line via respective readout switch circuits.

10 Claims, 12 Drawing Sheets

DETECTING DEVICE

CLAIM OF PRIORITY

The present application claims priority from International application No. PCT/JP2023/023070 filed on Jun. 22, 2023, which claims priority from Japanese Patent Application No. 2022-108132 filed on Jul. 5, 2022, the content of which are hereby incorporated by reference into this application.

BACKGROUND OF THE INVENTION

(1) Field of the Invention

The present disclosure relates to a detecting device, and is particularly applicable to a detecting device that detects neutron rays, X-rays, or the like.

(2) Background Technology

There is a radiographic device that sees through a subject by using neutron rays. Such a radiographic device includes a neutron ray source that emits neutron rays and a neutron ray detector that detects the neutron rays passed through the subject. Japanese Patent Laid-Open No. 2011-133441 has been proposed as the neutron ray detector that detects the neutron rays.

PRIOR ART DOCUMENT

Patent Document

[Patent Document 1] Japanese Patent Laid-Open No. 2011-133441

SUMMARY OF THE INVENTION

The following description is not publicly known matters, but is matters investigated by the present discloser et al.

According to the investigation by the present discloser et al., as illustrated in FIG. 1, a detecting device that detects neutron rays, X-rays, or the like may include amplifier circuits amp having a high amplification factor in each of a plurality of sensor pixels PX within the detecting device 10*r* in order to sense the neutron rays or the X-rays with low illuminance. In FIG. 1, one sensor pixel PX includes one photodiode PD and three amplifier circuits amp connected in series with each other. In this case, one sensor pixel PX may have a large-scale circuit configuration, and one sensor pixel PX may have a large pixel area, so that definition may be decreased.

In addition, as a method for reducing a pixel size, as illustrated in pixel layout examples 2L1 and 2L2 in FIG. 2, there is a method of dividing four photodiodes (PD1 to PD4) constituting a plurality of sensor pixels by transfer switches (TR1 to TR4), and sharing one amplifier circuit amp among the four sensor pixels. However, layout symmetry between the plurality of sensor pixels may be lost.

In addition, as illustrated in FIG. 3, load capacitances (ΔC1, ΔC2, ΔC3, and ΔC4) of the respective sensor pixels (PD1 to PD4) are not the same but are different from each other, and therefore the amplifier circuit amp having a high amplification factor amplifies and outputs difference between detection signals due to this load difference ($\Delta V=Q/\Delta C$). In other words, ΔV is amplified by the amplifier circuit amp, that is, amplified by an amplification factor A ($A\times\Delta V$), and may become a fixed pattern noise.

It is an object of the present disclosure to provide a technology of detecting neutron rays or X-rays with low illuminance while reducing the pixel area of sensor pixels and maintaining layout symmetry.

Other problems and novel features will become apparent from the description of the present specification and the accompanying drawings.

An outline of representatives of the present disclosure will be briefly described as follows.

That is, according to one embodiment, there is provided a detecting device including: a plurality of optical sensors; and a signal readout line, each of the plurality of optical sensors including a photodiode and an amplifier circuit, a plurality of the amplifier circuits provided in the plurality of optical sensors being connected in series with each other, outputs of a plurality of the photodiodes being connected to inputs of the plurality of amplifier circuits, respectively, via respective selecting switch circuits, outputs of the plurality of amplifier circuits being connected to the signal readout line via respective readout switch circuits.

DETAILED DESCRIPTION OF PREFERRED EMBODIMENTS

Figure 1:
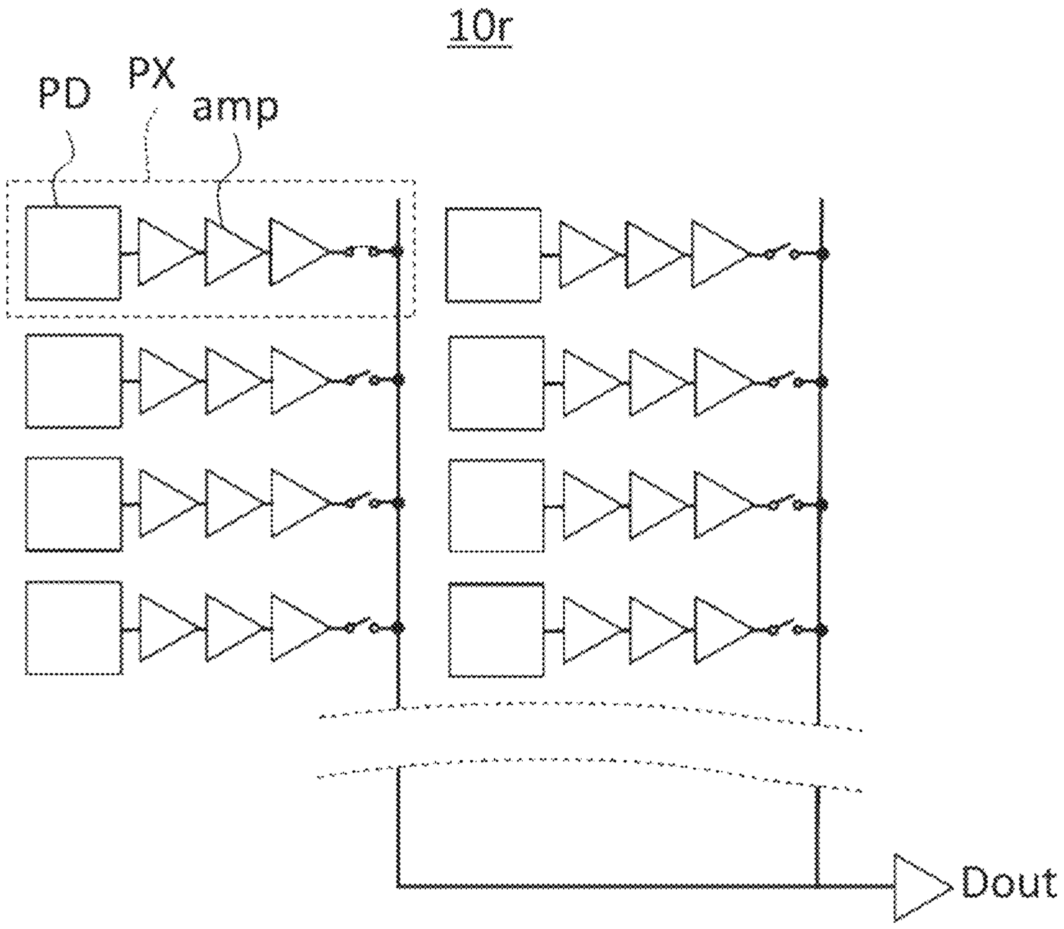
FIG. 1 is a diagram of explaining a detecting device according to a comparative example.
Figure 2:
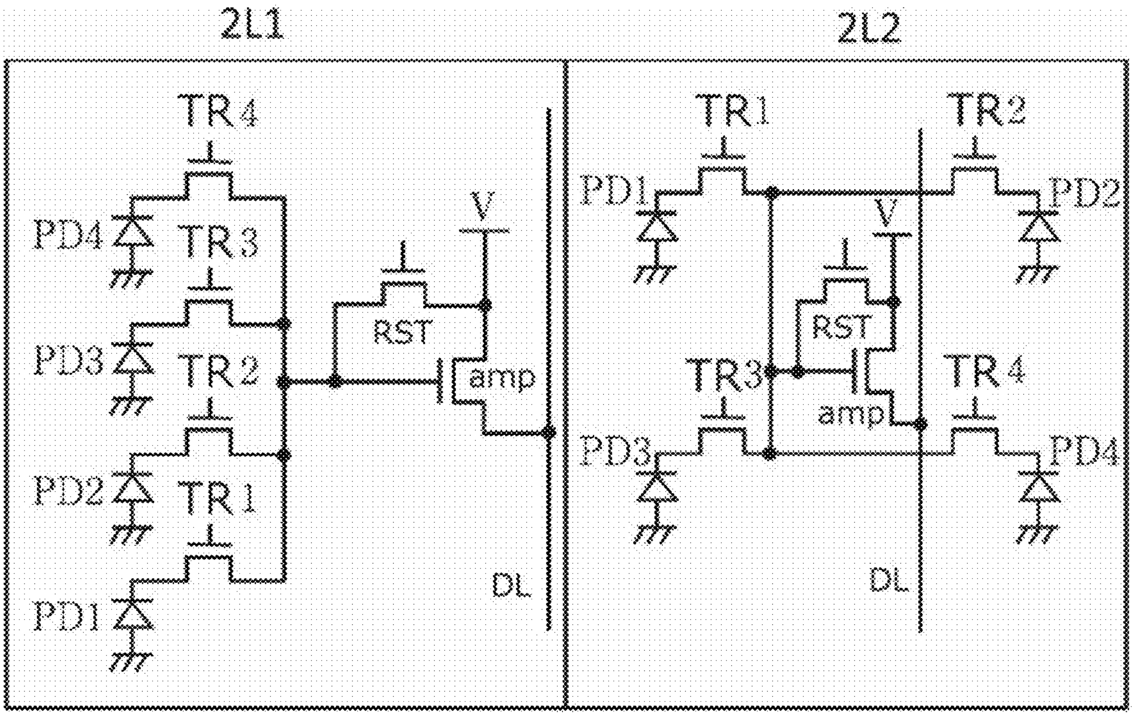
FIG. 2 is a diagram of explaining an example of a layout of sensor pixels.
Figure 3:
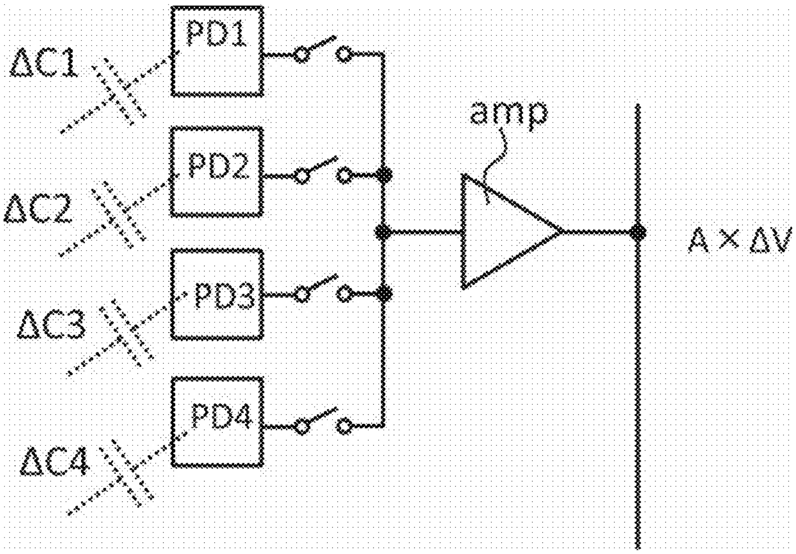
FIG. 3 is a diagram of explaining problems of the example of the layout in FIG. 2.

Embodiments of the present disclosure will hereinafter be described with reference to the drawings. It is to be noted that the disclosure is only a mere example, and that appropriate changes that can be easily made by those skilled in the art while the spirit of the invention is maintained are naturally included in the scope of the present invention. In addition, in order to make the description clearer, the drawings may illustrate the widths, thicknesses, shapes, and the like of respective parts schematically as compared with actual modes. However, the widths, thicknesses, shapes, and the like of the respective parts are a mere example, and do not limit the interpretation of the present invention. In addition, in the present specification and the drawings, elements similar to those described earlier with reference to preceding drawings are identified by the same reference numerals, and detailed description thereof may be omitted as appropriate.

Working Example

Figure 4:
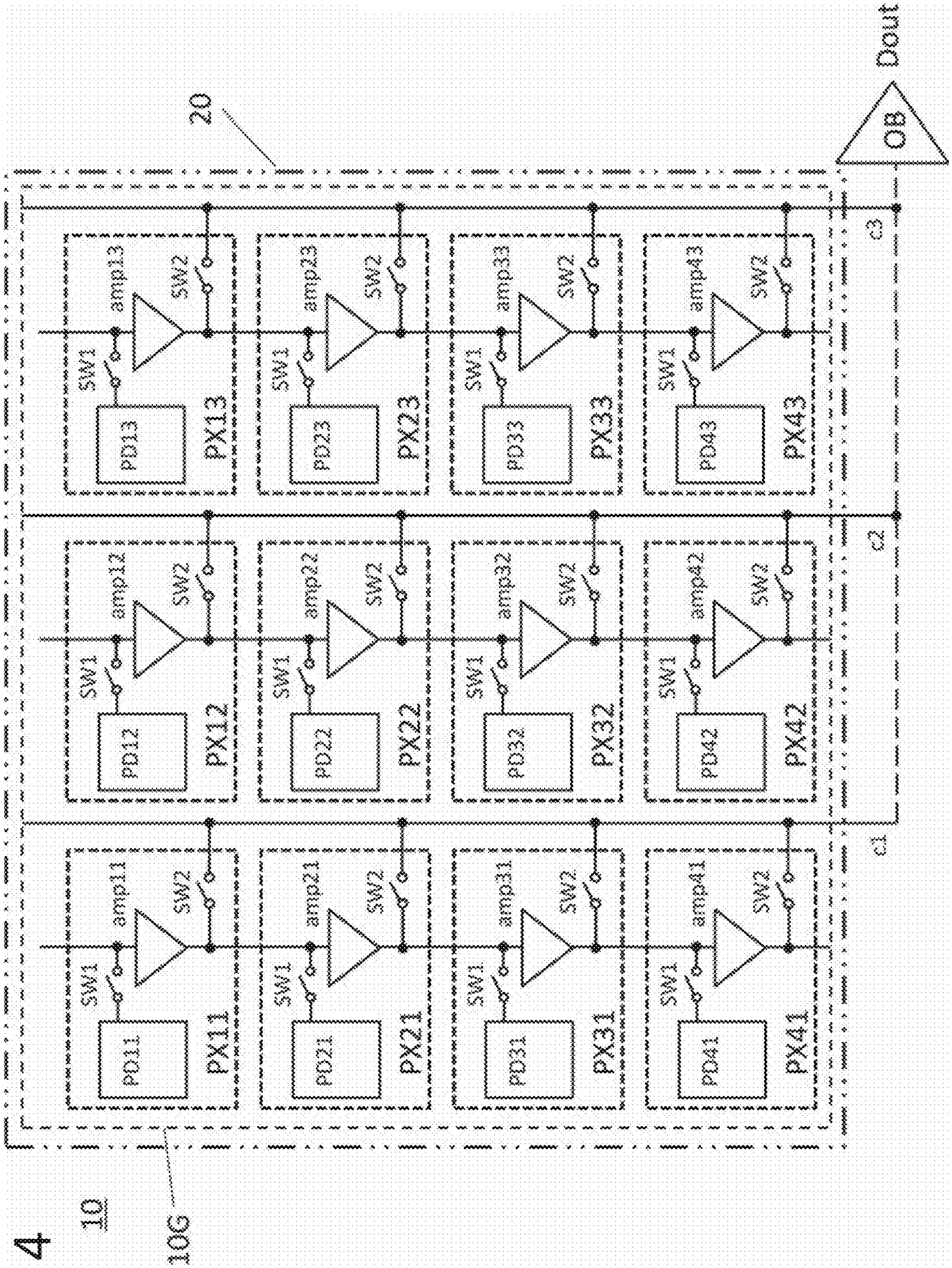
FIG. 4 is a conceptual diagram of explaining a pixel region of a detecting device according to an embodiment.
Figure 5:
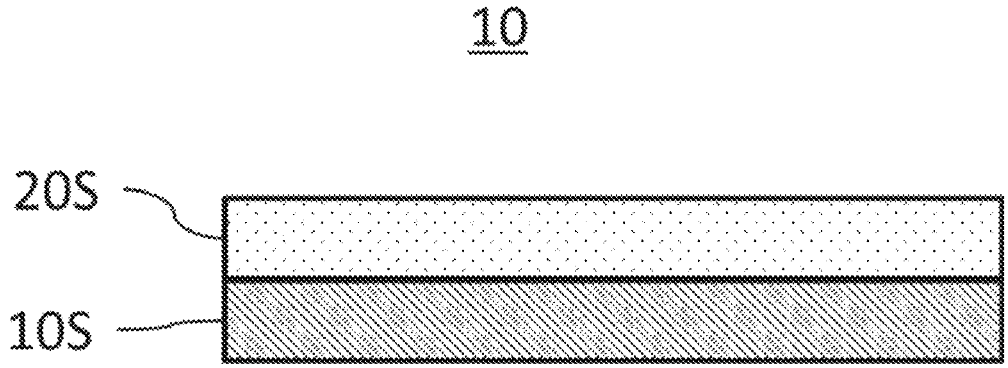
FIG. 5 is a conceptual sectional view of the detecting device in FIG. 4.

FIG. 4 is a conceptual diagram of explaining a pixel region of a detecting device according to an embodiment. FIG. 5 is a conceptual sectional view of the detecting device in FIG. 4.

As illustrated in FIG. 4, a pixel region 10G of a detecting device 10 includes a plurality of pixels PX (PXnm: n=1, 2, 3, 4, . . . , m=1, 2, 3, 4, . . . ) arranged in the form of a matrix (matrix form). The plurality of pixels PX are arranged in a matrix form at equal intervals in a vertical direction and a horizontal direction. A scintillator 20 is provided on the pixel region 10G so as to overlap the pixel region 10G. That is, as illustrated in FIG. 5, a scintillator layer 20S is provided on a substrate 10S on which the detecting device 10 is formed, such that the scintillator layer 20S overlaps the substrate 10S. The plurality of pixels PX (PX11 to PX43) in the present example are depicted as a matrix configuration of four rows×three columns. However, without being limited to this, the plurality of pixels PX may be set as a matrix configuration of N rows×M columns. The pixels PX can be reworded as optical sensors. The pixel region 10G can be reworded as a detection region.

Each of the plurality of pixels PX includes: a photodiode PD as an optical sensor element (light detecting element) that detects neutron rays, X-rays, or the like; an amplifier circuit amp; a first switch element SW1 as a selecting switch circuit provided between the output of the photodiode PD and the input of the amplifier circuit amp; and a second switch element SW2 as a readout switch circuit provided between the output of the amplifier circuit amp and a column signal line cn (n=1, 2, 3, 4, . . . ) as a signal readout line.

In addition, a plurality of amplifier circuits provided in a column direction in pixels PX of respective columns (for example, PX11, PX21, PX31, and PX41) are connected in series with each other. That is, a configuration is made such that the output of an amplifier circuit amp11 of a pixel PX11 and the input of an amplifier circuit amp21 of a pixel PX21 are electrically connected to each other, the output of the amplifier circuit amp21 of the pixel PX21 and the input of an amplifier circuit amp31 of a pixel PX31 are electrically connected to each other, and the output of the amplifier circuit amp31 of the pixel PX31 and the input of an amplifier circuit amp41 of a pixel PX41 are electrically connected to each other. Incidentally, as will be described with reference to FIG. 11, among the plurality of amplifier circuits connected in series with each other, the output of one amplifier circuit and the input of another amplifier circuit are coupled each other in terms of alternating current via a capacitive element (CE). For example, the output of the amplifier circuit amp11 of the pixel PX11 and the input of the amplifier circuit amp21 of the pixel PX21 are electrically coupled each other in terms of alternating current via the capacitive element CE. The capacitive element CE interrupts (cuts off) a direct-current component.

Hence, the outputs of the plurality of photodiodes PD are respectively connected to the inputs of the plurality of amplifier circuits amp via the respective selecting switch circuits (SW1). The outputs of the plurality of amplifier circuits amp are connected to the signal readout line cn via the respective readout switch circuits (SW2).

The column signal line cn (n=1, 2, 3, 4, . . . ) is configured to be selectively connected to the input of an output buffer circuit OB. A signal from the selected column signal line cn (n=1, 2, 3, 4, . . . ) is output as an output signal Dout by the output buffer circuit OB.

Here, when a neutron ray enters the scintillator layer 20S, a fluorescence occurs in the scintillator layer 20S, and the fluorescence is detected by a photodiode. For example, when a detection signal detected by a photodiode PD21 of the pixel PX21 is to be amplified and output, the first switch element SW1 of the pixel PX21 is set in an on state, and the detection signal detected by the photodiode PD21 is input to the input of the amplifier circuit amp21, and is then amplified. In a case where the detection signal detected by the photodiode PD21 is to be amplified by using three amplifier circuits, the respective second switch elements SW2 of the pixel PX11, PX21, and PX31 are set in an off state, and only the second switch element SW2 of the pixel PX41 is turned on. Consequently, the detection signal detected by the photodiode PD21 is amplified by using the three amplifier circuits, that is, the amplifier circuits amp21, amp31, and amp41, and is input to the output buffer circuit OB via the column signal line c1. The positions in the column direction of the selected selecting switch circuit (first switch element SW1) and the readout switch circuit (second switch element SW2) through which the readout is performed are configured to be different from each other.

That is, when the output of a predetermined photodiode (PD21) within a predetermined optical sensor (pixel PX21) is to be read out, the selecting switch circuit (SW1) connected to the output of the predetermined photodiode (PD21) is set in an on state, and the readout switch circuit (SW2) connected to the output of the amplifier circuit (amp21) within the predetermined optical sensor (pixel PX21) is set in an off state. Further, the readout switch circuit (SW2 of the optical sensor PX41) between the output of an amplifier circuit (amp41 of the optical sensor PX41), that is provided on the lower side (downstream side) of the amplifier circuit (amp21) within the predetermined optical sensor (pixel PX21) and that is a plurality of stages ahead of the amplifier circuit (amp21), and the signal readout line (c1) is set in an on state.

The detecting device 10 illustrated in FIG. 4 provides one or a plurality of effects in the following.

1) The number of elements necessary for one pixel is reduced, and the pixel area of one pixel is reduced. This can enhance definition. In addition, sensitivity can be improved through a load reduction in one pixel. That is, because the pixel area of one pixel PX can be reduced as compared with the pixel configuration of FIG. 1, it is possible to maintain or enhance the definition without decreasing the definition.
2) Because the pixels having a similar configuration are arranged and juxtaposed in a matrix form, there is a high symmetry of a pixel layout, and no fixed pattern noise occurs. That is, because the layout symmetry between the plurality of pixels is maintained, the load capacitance of each pixel (PX11 to PX44) can be made to be the same. Therefore, the occurrence of a fixed pattern noise can be prevented even when the detection signal is amplified by the amplifier circuits amp having a high amplification factor.
3) The amplification factor can be changed by changing the number of stages of amplifier circuits amp used for the amplification to, for example, one, two, or three through a change in driving.

Figure 6:
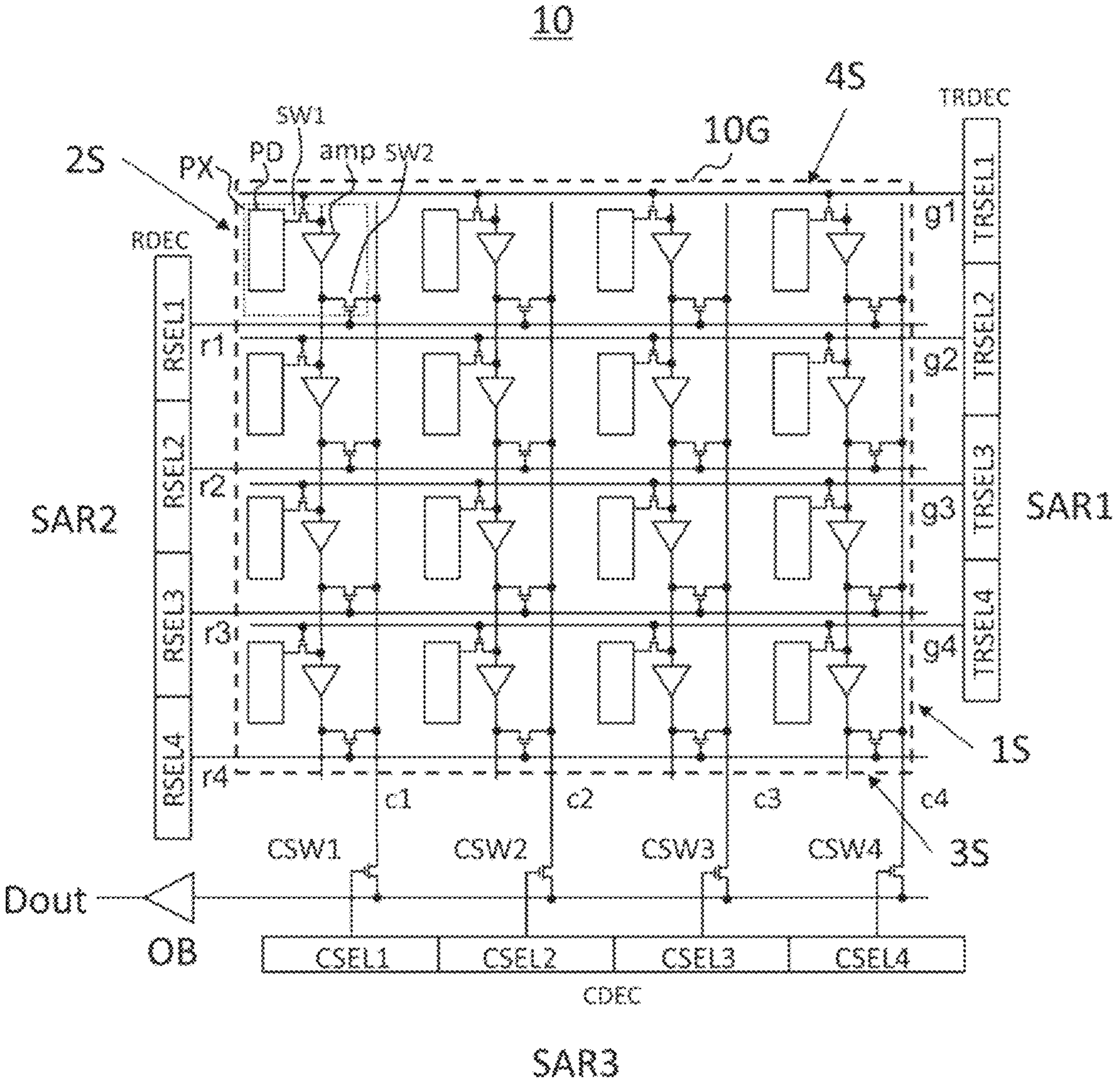
FIG. 6 is a circuit diagram illustrating a general configuration of the detecting device according to the embodiment.

FIG. 6 is a circuit diagram illustrating a general configuration of the detecting device according to the embodiment.

In the detecting device 10 illustrated in FIG. 6, illustratively, a plurality of pixels PX are arranged in a matrix configuration of four rows×four columns. Each of the pixels PX has a configuration similar to that in FIG. 4. However, the first switch element SW1 as a selecting switch circuit and the second switch element SW2 as a readout switch circuit are depicted as an N-channel metal-oxide-semiconductor field-effect transistor (MOSFET). The source-drain path of the MOSFET of the first switch element SW1 is connected between the output of the photodiode PD and the input of the amplifier circuit amp. The source-drain path of the MOSFET of the second switch element SW2 is connected between the output of the amplifier circuit amp and the column signal line cn (n=1, 2, 3, 4) as a signal readout line.

Each of gates of the first switch elements SW1 of the respective pixels PX in a first row is connected to a gate line g1. Each of gates of the first switch elements SW1 of the respective pixels PX in a second row is connected to a gate line g2. Each of gates of the first switch elements SW1 of the respective pixels PX in a third row is connected to a gate line g3. Each of gates of the first switch elements SW1 of the respective pixels PX in a fourth row is connected to a gate line g4.

Each of gates of the second switch elements SW2 of the respective pixels PX in the first row is connected to a row selection line r1. Each of gates of the second switch elements SW2 of the respective pixels PX in the second row is connected to a row selection line r2. Each of gates of the second switch elements SW2 of the respective pixels PX in the third row is connected to a row selection line r3. Each of gates of the second switch elements SW2 of the respective pixels PX in the fourth row is connected to a row selection line r4.

The source-drain paths of respective N-channel MOSFETs of column switch circuits CSW1 to CSW4 are connected between a plurality of column signal lines c1 to c4 and the input of the output buffer circuit OB.

The plurality of gate lines g1 to g4 are connected to a transfer decoder TRDEC as a first driving circuit. Hence, the transfer decoder TRDEC is connected to the gates of the plurality of selecting switch circuits (first switch elements SW1) arranged in a row direction. The transfer decoder TRDEC includes transfer selecting drivers TRSEL1, TRSEL2, TRSEL3, and TRSEL4 respectively connected to the gate lines g1, g2, g3, and g4. The transfer decoder TRDEC sets one of the plurality of gate lines g1 to g4 in a selected state (high level) on the basis of a transfer selection signal input to the transfer decoder TRDEC.

The plurality of row selection lines r1 to r4 are connected to a row decoder RDEC as a second driving circuit. Hence, the row decoder RDEC is connected to the gates of the plurality of readout switch circuits (second switch elements SW2) arranged in the row direction. The row decoder RDEC includes row selecting drivers RSEL1, RSEL2, RSEL3, and RSEL4 respectively connected to the row selection lines r1, r2, r3, and r4. The row decoder RDEC sets one of the plurality of row selection lines r1 to r4 in a selected state (high level) on the basis of a row selection signal input to the row decoder RDEC.

The gates of the respective N-channel MOSFETs of the plurality of column switch circuits CSW1 to CSW4 are connected to a column decoder CDEC as a selecting switch circuit. The column decoder CDEC includes column selecting drivers CSEL1, CSEL2, CSEL3, and CSEL4 respectively connected to the gates of the respective N-channel MOSFETS (CSW1 to CSW4). The column decoder CDEC sets one of the plurality of column switch circuits CSW1 to CSW4 in a selected state (on state) on the basis of a column selection signal input to the column decoder CDEC.

The detection region 10G in which the plurality of pixels PX are arranged in a matrix form is of a rectangular shape as viewed from above, and has a first side 1S, a second side 2S opposed to the first side 1S, a third side between the first side 1S and the second side 2S, and a fourth side 4S opposed to the third side 3S.

The first driving circuit (transfer decoder TRDEC) is disposed in a peripheral region SAR1 on the outside of the detection region 10G along the first side 1S of the detection region 10G.

The second driving circuit (row decoder RDEC) is disposed in a peripheral region SAR2 on the outside of the detection region 10G along the second side 2S of the detection region 10 opposed to the first side 1S.

The selecting switch circuit (column decoder CDEC) that selects a predetermined signal readout line among the plurality of signal readout lines (column signal line cn) is disposed in a peripheral region SAR3 on the outside of the detection region 10G along an arrangement direction of the plurality of signal readout lines (column signal line cn).

Figure 7:
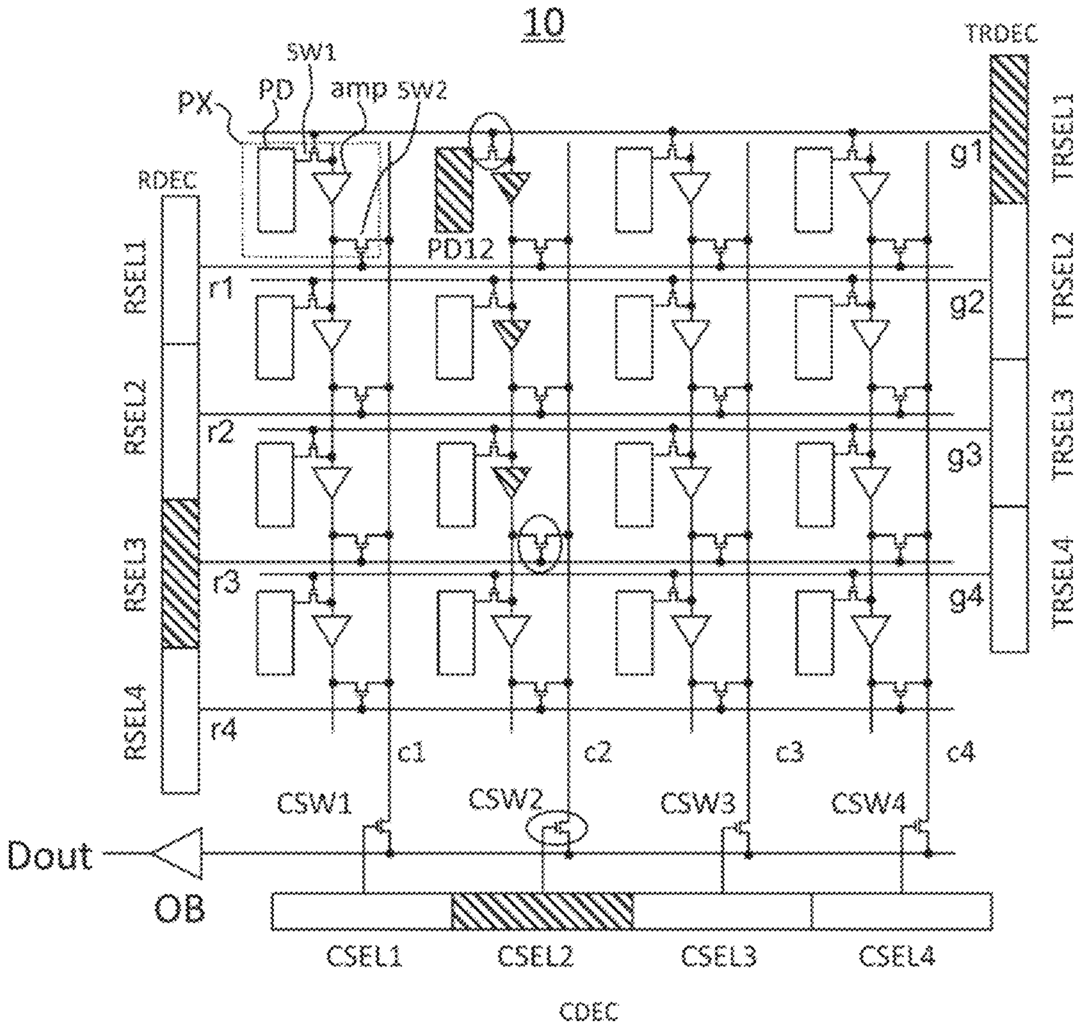
FIG. 7 is a diagram of explaining a first example of readout operation of the detecting device according to the embodiment.

FIG. 7 is a diagram of explaining a first example of readout operation of the detecting device according to the embodiment. FIG. 7 illustrates an example of the readout operation that amplifies the output of a phohertodiode PD by three amplifier circuits amp, and inputs the result to the output buffer circuit OB. In the present example, the transfer selecting driver TRSEL1 sets the gate line g1 in a selected state (high level), the row selecting driver RSEL3 sets the row selection line r3 in a selected state (high level), and the column selecting driver CSEL2 sets the column switch circuit CSW2 in a selected state (on state). Thus, the first switch element SW1, the second switch element SW2, and the column switch circuit CSW2 indicated by circle marks are set in a selected state (on state), and the output of a photodiode PD12 is amplified by the three amplifier circuits amp and supplied to the input of the output buffer circuit OB. Hence, the positions in the column direction of the selected selecting switch circuit (first switch element SW1 set in an on state) and the readout switch circuit through which the readout is performed (second switch element SW2 set in an on state) are different from each other.

Figure 8:
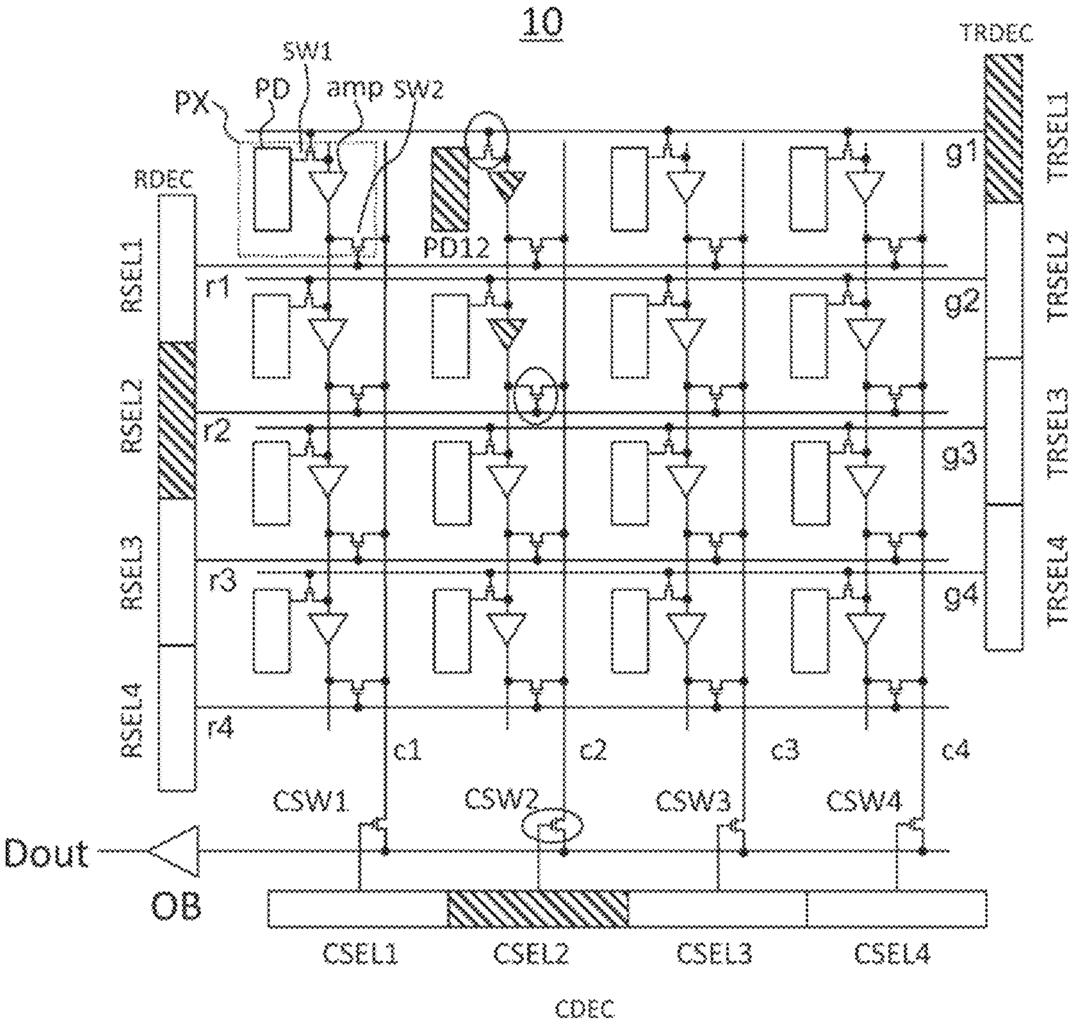
FIG. 8 is a diagram of explaining a second example of the readout operation of the detecting device according to the embodiment.

FIG. 8 is a diagram of explaining a second example of the readout operation of the detecting device according to the embodiment. FIG. 8 illustrates an example of the readout operation that amplifies the output of a photodiode PD by two amplifier circuits amp, and inputs the result to the output buffer circuit OB. In the present example, the transfer selecting driver TRSEL1 sets the gate line g1 in a selected state (high level), the row selecting driver RSEL2 sets the row selection line r2 in a selected state (high level), and the column selecting driver CSEL2 sets the column switch circuit CSW2 in a selected state (on state). Thus, the first switch element SW1, the second switch element SW2, and the column switch circuit CSW2 indicated by circle marks are set in a selected state (on state), and the output of the photodiode PD12 is amplified by the two amplifier circuits amp and supplied to the input of the output buffer circuit OB.

Similarly, in a case of a readout operation that amplifies the output of the photodiode PD by one amplifier circuit amp and inputs the result to the output buffer circuit OB, the row selecting driver RSEL1 sets the row selection line r1 in a selected state (high level) in place of the row selecting driver RSEL2 in FIG. 8. Then, it suffices for the transfer selecting driver TRSEL1 to set the gate line g1 in a selected state (high level) and for the column selecting driver CSEL2 to set the column switch circuit CSW2 in a selected state (on state).

Figure 9:
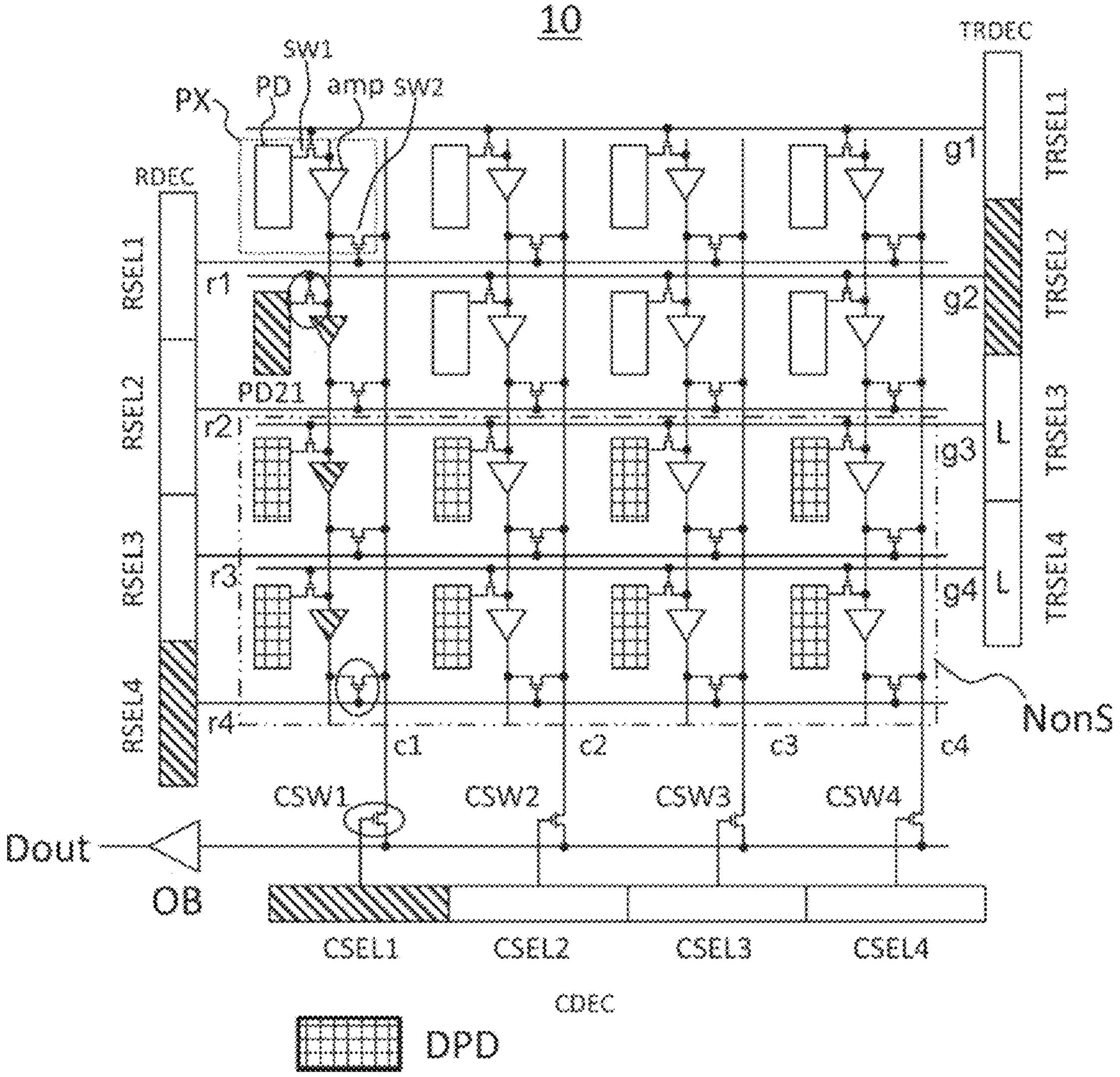
FIG. 9 is a circuit diagram illustrating a general configuration of a detecting device according to a first modification.

FIG. 9 is a circuit diagram illustrating a general configuration of a detecting device according to a first modification. In a case of amplifying the output of a photodiode PD by three amplifier circuits amp in the configuration of the detecting device 10 in FIG. 6, the outputs of the photodiodes PD of the pixels PX connected to the two rows on the lower side cannot be read out. In such a case, as illustrated in FIG. 9, in the first modification, the two rows on the lower side are set as a non-sensing operation region NonS, and are made to function as amplification stages for the output signal of the photodiode PD in the upper stage. In the non-sensing operation region NonS, dummy elements (dummy photodiodes) DPD are arranged in order to maintain the layout symmetry of the pixels PX and in order to provide each amplifier circuit with a uniform load. The transfer selecting drivers TRSEL3 and TRSEL4 are therefore configured to fixedly output a low level to the gate lines g3 and g4 in order to set the gate lines g3 and g4 in a non-selected state.

In the present example, the transfer selecting driver TRSEL2 sets the gate line g2 in a selected state (high level), the row selecting driver RSEL4 sets the row selection line r4 in a selected state (high level), and the column selecting driver CSEL1 sets the column switch circuit CSW1 in a selected state (on state). Thus, the first switch element SW1, the second switch element SW2, and the column switch circuit CSW2 indicated by circle marks are set in a selected state (on state), and the output of the photodiode PD21 is amplified by the three amplifier circuits amp and supplied to the input of the output buffer circuit OB. Among the three amplifier circuits amp, amplifier circuits in the non-sensing operation region NonS are used as two lower amplifier circuits amp.

In the present example, the photodiodes of a plurality of pixels in the two rows (two lowermost rows) close to the selecting switch circuit (column decoder CDEC) are set as the dummy elements DPD. However, the photodiodes of a plurality of pixels in at least one row (one lowermost row) close to the selecting switch circuit (column decoder CDEC) may be set as dummy elements DPD. In a case where the photodiodes of the plurality of pixels in the one lowermost row are set as the dummy elements DPD, photodiodes PD in the second row counted from the lowermost stage are used, and therefore amplification is performed by two amplifier circuits.

Figure 10:
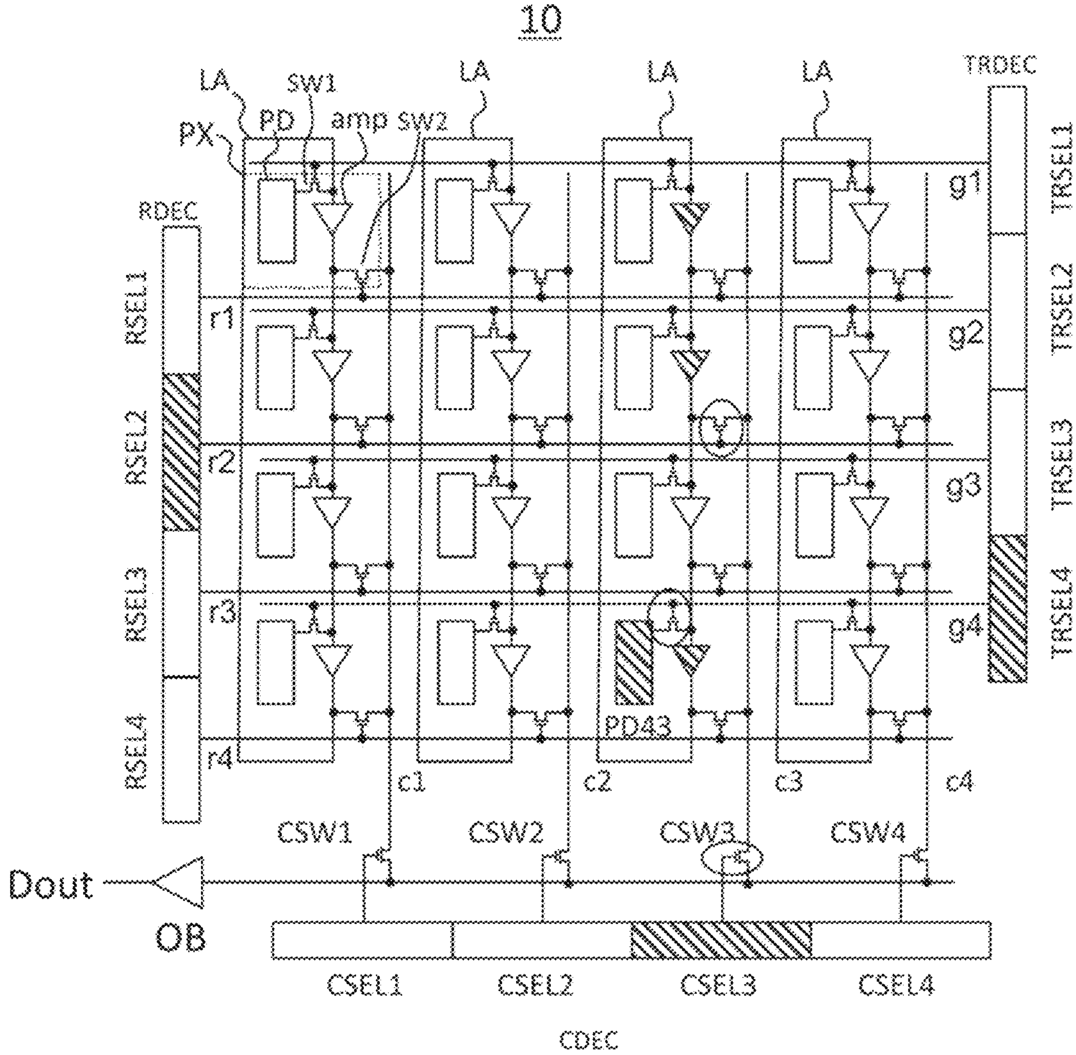
FIG. 10 is a circuit diagram illustrating a general configuration of a detecting device according to a second modification.

FIG. 10 is a circuit diagram illustrating a general configuration of a detecting device according to a second modification. In FIG. 9, the two rows on the lower side are set as the non-sensing operation region NonS. However, this means that there is a useless region in the substrate of the detecting device 10. In the second modification, wiring LA is added so that the outputs of the amplifier circuits amp in the lowermost stage are, for example, connected to the inputs of amplifier circuits amp in an uppermost row. Hence, also the outputs of the photodiodes PD of the pixels PX connected to the two rows on the lower side can be read out through amplification performed by three amplifier circuits amp.

In the present example, the transfer selecting driver TRSEL4 sets the gate line g4 in a selected state (high level), the row selecting driver RSEL2 sets the row selection line r2 in a selected state (high level), and the column selecting driver CSEL3 sets the column switch circuit CSW3 in a selected state (on state). Thus, the first switch element SW1, the second switch element SW2, and the column switch circuit CSW2 indicated by circle marks are set in a selected state (on state), and the output of a photodiode PD43 is amplified by three amplifier circuits amp and supplied to the input of the output buffer circuit OB. Among the three amplifier circuits amp, two amplifier circuits amp being used are on the upper side (upstream side).

That is, in the column direction, the output of the amplifier circuit amp in the lowermost row is connected to the input of the amplifier circuit amp in the uppermost row. Then, in a case of performing detection by the photodiode PD within the pixel PX in the lowermost row, the output of the photodiode PD within the pixel PX in the lowermost row is configured to be amplified by using also the amplifier circuit amp in the uppermost row.

Figure 11:
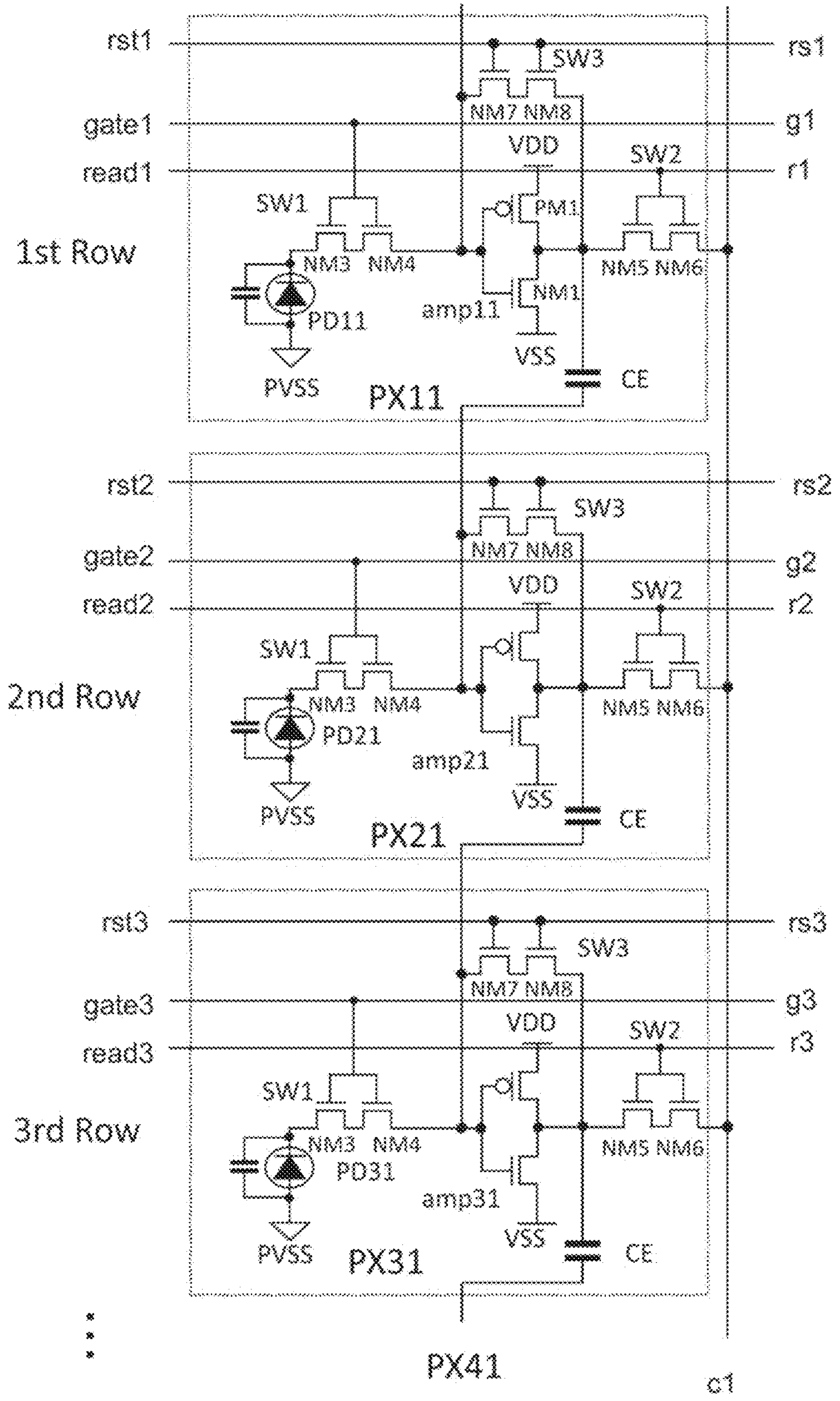
FIG. 11 is a circuit diagram illustrating an example of a configuration of pixels of the detecting device according to the embodiment.
Figure 12:
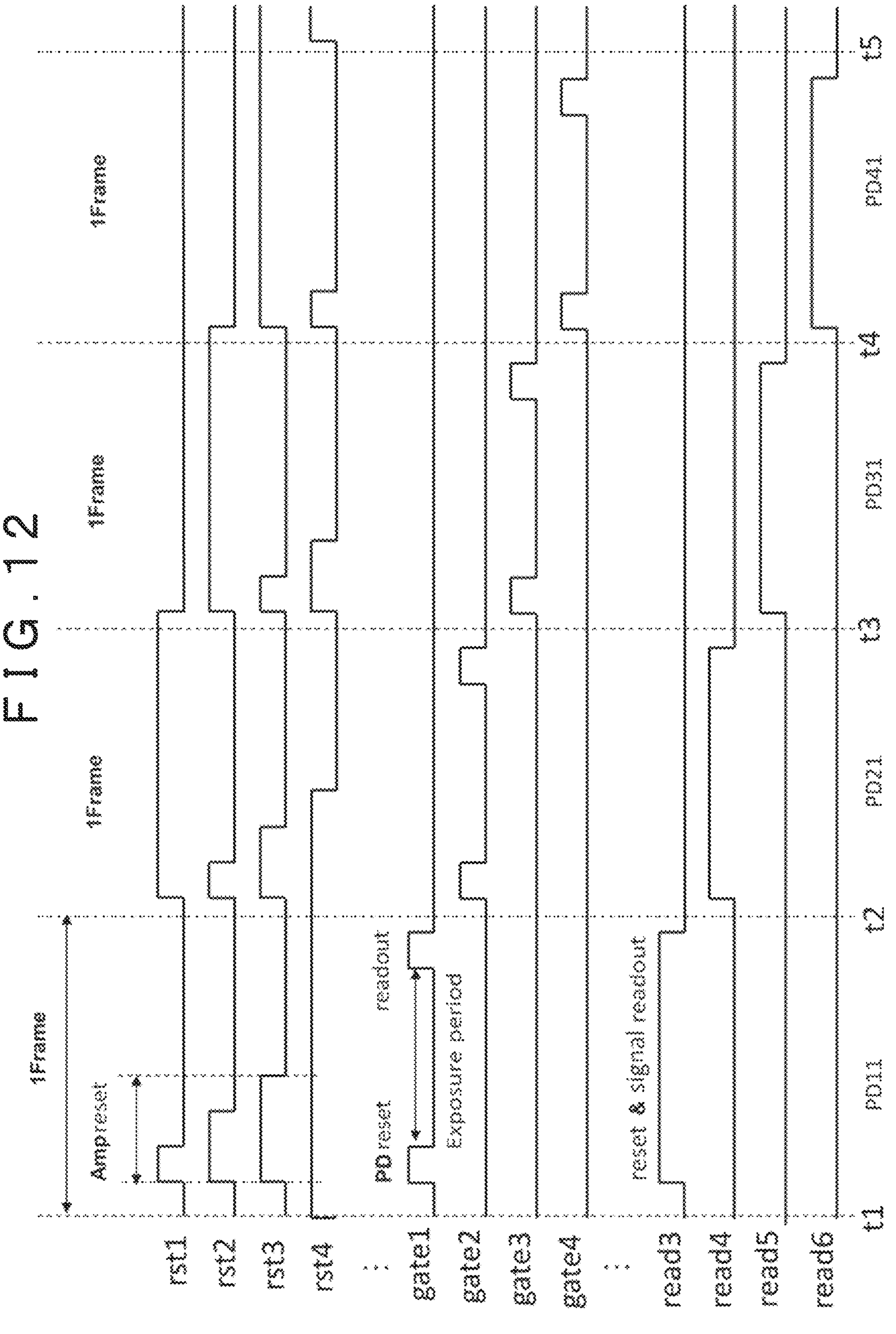
FIG. 12 is a diagram of explaining timing of the readout operation of the detecting device according to the embodiment.

FIG. 11 is a circuit diagram illustrating an example of a detailed configuration of pixels of the detecting device according to the embodiment. FIG. 12 is a diagram of explaining timing of the readout operation of the detecting device according to the embodiment. FIG. 11 illustratively depicts a detailed circuit configuration of three pixels PX11, PX21, and PX31. The three pixels PX11, PX21, and PX31 have the same circuit configuration. Therefore, the circuit configuration of the pixel PX11 will be described as a representative. PVSS is a ground potential of a photodiode PD11.

In the pixel PX11, the amplifier circuit amp11 is formed by an inverter circuit constituted by a p-channel metal-oxide semiconductor (PMOS) transistor PM1 and an n-channel metal-oxide semiconductor (NMOS) transistor NM1. The source-drain path of the PMOS transistor PM1 and the source-drain path of the NMOS transistor NM1 are directly connected between a power supply potential VDD and a ground potential VSS. The input of the amplifier circuit amp11 is a shared gate electrode of the PMOS transistor PM1 and the NMOS transistor NM1. The output of the amplifier circuit amp11 is a shared drain electrode of the PMOS transistor PM1 and the NMOS transistor NM1.

The first switch element SW1 is constituted by two NMOS transistors NM3 and NM4. The respective gate electrodes of the NMOS transistors NM3 and NM4 are connected to the gate line g1. The source-drain path of the NMOS transistor NM3 and the source-drain path of the NMOS transistor NM4 are directly connected between the output of the photodiode PD11 and the input of the amplifier circuit amp11.

The second switch element SW2 is constituted by two NMOS transistors NM5 and NM6. The respective gate electrodes of the NMOS transistors NM5 and NM6 are connected to the row selection line r1. The source-drain path of the NMOS transistor NM5 and the source-drain path of the NMOS transistor NM6 are directly connected between the output of the amplifier circuit amp11 and the column signal line c1.

A third switch element SW3 as a reset circuit is constituted by two NMOS transistors NM7 and NM8. The respective gate electrodes of the NMOS transistors NM7 and NM8 are connected to a reset signal line rs1. The source-drain path of the NMOS transistor NM7 and the source-drain path of the NMOS transistor NM8 are directly connected between the input and output of the amplifier circuit amp11. When the third switch element SW3 is set in an on state, the input and output of the amplifier circuit amp11 are electrically connected to each other, so that the potentials thereof are reset. In the pixels PX21 and PX31, the gate electrodes of the NMOS transistors NM7 and NM8 are similarly connected to reset signal lines rs2 and rs3, respectively.

A capacitive element CE is connected between the output of the amplifier circuit amp11 and the input of the amplifier circuit amp21 of the pixel PX21. Similarly, a capacitive element CE is connected between the output of the amplifier circuit amp21 and the input of the amplifier circuit amp31 of the pixel PX31.

A readout operation for the photodiode PD of a pixel PX will next be described with reference to FIG. 12.

As illustrated in FIG. 12, a period from time t1 to time t2 is set as one frame (1Frame), and a readout operation for the photodiode PD11 is performed during the one frame from time t1 to time t2. A readout operation for the photodiode PD21 is performed during a period of one frame from time t2 to time t3. A readout operation for the photodiode PD31 is performed during a period of one frame from time t3 to time t4. A readout operation for the photodiode PD41 is performed during a period of one frame from time t4 to time t5.

The readout operation for the photodiode PD11 during the period of the one frame from time t1 to time t2 will be described as a representative. The period of the one frame includes an Amp reset period for simultaneously resetting the amplifier circuits amp11, amp21, amp31, amp41, and the like that continue in the column direction, a PD reset period, an exposure period, and a readout period of the photodiode PD11, and a reset and signal readout period of the column signal line c1.

In the Amp reset period, reset signals rst1, rst2, and rst3 of the reset signal lines rs1, rs2, and rs3 are changed from a low level to a high level, and thereby the respective third switch elements SW3 of the pixels PX11, PX21, and PX31 are set in an on state. A reset signal rst4 of a reset signal line rs4 is held at a high level during the period of the one frame (the amplifier circuit amp41 maintains a reset state). Thus, the input and output of each of the plurality of amplifier circuits (amp11, amp21, amp31, amp41, . . . ) that continue in the column direction are electrically connected to each other, so that the potentials thereof are reset. The reset signal rst1 makes a transition from a high level to a low level. The reset signal rst2 makes a transition to a low level after the reset signal rst1 makes a transition to a low level. The reset signal rst3 makes a transition to a low level after the reset signal rst2 makes a transition to a low level. That is, the reset period of an amplifier circuit located on a lower side in the column direction is set longer than the reset period of an amplifier circuit located on an upper side. The three amplifier circuits are thereby reset reliably. Incidentally, in the present example, in a case where the three amplifier circuits (amp21, amp31, and amp41) are used for amplification, the three amplifier circuits (amp21, amp31, and amp41) are reset by the reset signals rst2, rst3, and rst4 in the reset period, and one amplifier circuit (amp11) located on the upper side of the three amplifier circuits (amp21, amp31, and amp41) and one amplifier circuit (amp51) located on the lower side of the three amplifier circuits (amp21, amp31, and amp41) are also configured to be continuously reset by the reset signals rst1 and rst5 in the period of the one frame. This can reduce effects of the amplifier circuits (amp11 and amp51) located on the upper side and the lower side of the three amplifier circuits (amp21, amp31, and amp41) used for the amplification while the three amplifier circuits (amp21, amp31, and amp41) are performing the amplification. The output signal of the photodiode (PD21) can therefore be amplified accurately.

Meanwhile, in synchronism with the transition of the reset signal rst1 from a low level to a high level, a gate signal gate1 of the gate line g1 and a readout signal read3 of the row selection line r3 make a transition from a low level to a high level. The PD reset period of the photodiode PD11 is thereby started. In the PD reset period, the first switch element SW1 of the pixel PX11 is set in an on state. In addition, the second switch element SW2 within the pixel PX3 is set in an on state, and thereby the potential of the column signal line c1 is reset.

When the PD reset period is ended, the gate signal gate1 makes a transition from a high level to a low level, and the exposure period of the photodiode PD11 is started. When the exposure period is ended, the gate signal gate1 makes a transition from a low level to a high level, and the readout period of the photodiode PD11 is started. At this time, since the reset signals rst1, rst2, and rst3 are at a low level, the respective third switch elements SW3 of the pixels PX11, PX21, and PX31 are in an off state, the first switch element SW1 of the pixel PX11 is in an on state, and the second switch element SW2 within the pixel PX3 is in an on state. Thus, the output of the photodiode PD11 is amplified by the amplifier circuits amp11, amp21, and amp31, and is read out to the column signal lines c1. When the readout to the column signal line c1 is ended, the gate signal gate1 of the gate line g1 and the readout signal read3 of the row selection line r3 make a transition from a high level to a low level. The period of the one frame is then ended.

Thereafter, by a similar operation, the readout operation for the photodiode PD21 is performed in the period from time t2 to time t3, the readout operation for the photodiode PD31 is performed in the period from time t3 to time t4, and the readout operation for the photodiode PD41 is performed in the period from time t4 to time t5.

All of detecting devices that can be implemented by those skilled in the art by making design changes as appropriate on the basis of the detecting device described above as an embodiment of the present invention also belong to the scope of the present invention as long as including the spirit of the present invention.

A person skilled in the art can conceive various kinds of modification examples and correction examples in a category of ideas of the present invention. It is therefore to be understood that those modification examples and correction examples also belong to the scope of the present invention. For example, embodiments obtained by a person skilled in the art by adding, deleting, or making design changes in constituent elements or adding, omitting, or making condition changes in processes as appropriate in each of the foregoing embodiments are included in the scope of the present invention as long as including the spirit of the present invention.

In addition, it is to be understood that other actions and effects that are produced by modes described in the present embodiment and that are obvious from the description of the present specification or can be conceived as appropriate by those skilled in the art are naturally produced by the present invention.

Various inventions can be formed by appropriate combinations of a plurality of constituent elements disclosed in the foregoing embodiment. For example, a few constituent elements may be deleted from all of the constituent elements illustrated in the embodiment. Further, constituent elements of different embodiments may be combined with each other as appropriate.

What is claimed is:

1. A detecting device comprising:

a plurality of optical sensors; and a signal readout line, wherein each of the plurality of optical sensors including a photodiode and an amplifier circuit, a plurality of the amplifier circuits provided in the plurality of optical sensors being connected in series with each other, outputs of a plurality of the photodiodes being connected to inputs of the plurality of amplifier circuits, respectively, via respective selecting switch circuits, outputs of the plurality of amplifier circuits being connected to the signal readout line via respective readout switch circuits, the plurality of the amplifier circuits includes a first amplification circuit, a second amplification circuit, and a third amplification circuit, the readout switch circuits includes a first readout switch circuit, a second readout switch circuit, and a third readout switch circuit, the output of the first amplification circuit is directly connected to an input of the second amplification circuit, the output of the second amplification circuit is connected to an input of the third amplification circuit, the output of the first amplification circuit is connected to the signal readout line via the first readout switch circuit, the output of the second amplification circuit is connected to the signal readout line via the second readout switch circuit, and the output of the third amplification circuit is connected to the signal readout line via the third readout switch circuit.

2. The detecting device according to claim 1, wherein the plurality of optical sensors are arranged in a matrix form at equal intervals in a vertical direction and a horizontal direction.

3. A detecting device comprising:

a plurality of optical sensors; and a signal readout line, wherein each of the plurality of optical sensors including a photodiode and an amplifier circuit, a plurality of the amplifier circuits provided in the plurality of optical sensors being connected in series with each other, outputs of a plurality of the photodiodes being connected to inputs of the plurality of amplifier circuits, respectively, via respective selecting switch circuits, outputs of the plurality of amplifier circuits being connected to the signal readout line via respective readout switch circuits, when an output of a predetermined photodiode within a predetermined optical sensor is read out, a selecting switch circuit connected to the output of the predetermined photodiode is set in an on state, a readout switch circuit connected to an output of an amplifier circuit within the predetermined optical sensor is set in an off state, and a readout switch circuit between an output of an amplifier circuit that is a plurality of stages ahead of the amplifier circuit within the predetermined optical sensor and the signal readout line is set in an on state.

4. A detecting device comprising:

a plurality of optical sensors;

a signal readout line;

a first driving circuit; and a second driving circuit, wherein each of the plurality of optical sensors including a photodiode and an amplifier circuit, a plurality of the amplifier circuits provided in the plurality of optical sensors being connected in series with each other, outputs of a plurality of the photodiodes being connected to inputs of the plurality of amplifier circuits, respectively, via respective selecting switch circuits, outputs of the plurality of amplifier circuits being connected to the signal readout line via respective readout switch circuits, the plurality of optical sensors are arranged in a matrix form, a plurality of the signal readout lines are provided, the first driving circuit is connected to gates of the plurality of selecting switch circuits arranged in a row direction, the second driving circuit is connected to gates of the plurality of readout switch circuits arranged in the row direction, and positions in a column direction of a selected selecting switch circuit and a readout switch circuit through which readout is performed are different from each other.

5. The detecting device according to claim 4, wherein the plurality of optical sensors are arranged in a detection region, the first driving circuit is disposed in a peripheral region along a first side of the detection region, the second driving circuit is disposed in a peripheral region along a second side of the detection region opposed to the first side, and the selecting switch circuits configured to select a predetermined signal readout line among the plurality of signal readout lines are arranged in a peripheral region of the detection region along an arrangement direction of the plurality of signal readout lines.

6. The detecting device according to claim 4, wherein photodiodes of optical sensors in at least one row close to the selecting switch circuits are dummy elements.

7. The detecting device according to claim 1, wherein the amplifier circuit includes an inverter circuit constituted by a PMOS transistor and an NMOS transistor, and a reset circuit configured to electrically connect an output and an input of the inverter circuit to each other.

8. The detecting device according to claim 7, wherein the plurality of amplifier circuits that continue in a column direction are reset simultaneously.

9. The detecting device according to claim 4, wherein in the column direction, an output of an amplifier circuit in a lowermost row is connected to an input of an amplifier circuit in an uppermost row, and in a case of performing detection by a photodiode within an optical sensor in the lowermost row, an output of the photodiode is amplified by using also the amplifier circuit in the uppermost row.

10. The detecting device according to claim 5, wherein a scintillator overlaps the detection region.

* * * * *